US008528230B2

(12) United States Patent
Ashrafzadeh et al.

(10) Patent No.: US 8,528,230 B2
(45) Date of Patent: Sep. 10, 2013

(54) LAUNDRY TREATING APPLIANCE WITH BULKY ITEM DETECTION

(75) Inventors: Farhad Ashrafzadeh, Stevensville, MI (US); James P. Carow, Saint Joseph, MI (US); Shreecharan Kanchanavally, Lisle, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 989 days.

(21) Appl. No.: 12/388,620

(22) Filed: Feb. 19, 2009

(65) Prior Publication Data

US 2010/0205825 A1 Aug. 19, 2010

(51) Int. Cl.

| | |
|---|---|
| ***F26B 13/10*** | (2006.01) |
| ***F26B 19/00*** | (2006.01) |
| ***G06K 9/00*** | (2006.01) |
| ***H04H 60/56*** | (2008.01) |
| ***G05B 15/00*** | (2006.01) |
| ***G03B 17/00*** | (2006.01) |
| *H04H 60/00* | (2008.01) |

(52) U.S. Cl.
USPC .................. 34/560; 34/529; 34/88; 382/111; 382/107; 725/12; 700/259; 116/213

(58) Field of Classification Search
USPC ............ 34/486, 445, 524, 529, 449, 88, 560, 34/130; 8/137; 356/914; 73/1.56; 382/107.111; 725/12; 700/259, 275; 116/213
See application file for complete search history.

(56) References Cited

U.S. PATENT DOCUMENTS

| | | | | |
|---|---|---|---|---|
| 4,306,495 | A * | 12/1981 | Grantham | 100/37 |
| 5,345,060 | A | 9/1994 | Hazan et al. | |
| 5,391,890 | A | 2/1995 | Migliorini | |
| 5,755,041 | A | 5/1998 | Horwitz | |
| 6,023,854 | A * | 2/2000 | Tsunomoto et al. | 34/531 |
| 6,026,592 | A | 2/2000 | Herr | |
| 6,488,155 | B2 | 12/2002 | Lawandy et al. | |
| 7,200,511 | B2 * | 4/2007 | Damrath | 702/127 |
| 7,363,780 | B2 | 4/2008 | Lee et al. | |
| 7,415,781 | B2 * | 8/2008 | Barron et al. | 34/595 |
| 2001/0049846 | A1 | 12/2001 | Guzzi et al. | |
| 2002/0118366 | A1 | 8/2002 | Baldwin | |
| 2003/0034443 | A1 | 2/2003 | Kouznetsov et al. | |
| 2004/0249843 | A1 | 12/2004 | Damrath | |
| 2005/0004956 | A1 | 1/2005 | Pourdeyhimi | |
| 2005/0196046 | A1 | 9/2005 | Hudnut et al. | |
| 2006/0243931 | A1 | 11/2006 | Haran et al. | |
| 2006/0255300 | A1 | 11/2006 | Shakespeare | |
| 2007/0272272 | A1 | 11/2007 | Choi et al. | |
| 2008/0013818 | A1 | 1/2008 | Shakespeare | |
| 2008/0276964 | A1 | 11/2008 | Hendrickson et al. | |
| 2011/0067186 | A1 * | 3/2011 | Johansson | 8/137 |

FOREIGN PATENT DOCUMENTS

| | | | |
|---|---|---|---|
| DE | 3938822 | A1 | 5/1991 |
| DE | 19961459 | A1 | 7/2001 |
| DE | 10156157 | A1 | 5/2003 |
| DE | 10302866 | A1 | 8/2004 |

(Continued)

*Primary Examiner* — Kenneth Rinehart
*Assistant Examiner* — John McCormack
(74) *Attorney, Agent, or Firm* — Clifton G. Green; McGarry Bair PC

(57) ABSTRACT

A laundry treating appliance and method for controlling the operation of a laundry treating appliance comprising a treating chamber by determining the presence of a bulky laundry item based on image data of the laundry.

53 Claims, 10 Drawing Sheets

(56) References Cited

FOREIGN PATENT DOCUMENTS

| | | | | |
|---|---|---|---|---|
| DE | 102005055411 | A1 | | 5/2007 |
| EP | 0544945 | A1 | | 6/1993 |
| FR | 2894996 | A1 | | 6/2007 |
| JP | 04012799 | A | | 1/1992 |
| JP | 04244193 | A | * | 9/1992 |
| JP | 4244193 | A | | 9/1992 |
| JP | 10-277292 | A | | 10/1998 |
| JP | 2002224486 | A | | 8/2002 |
| JP | 2007-221711 | A | | 8/2007 |
| JP | 2008054960 | A | | 3/2008 |
| WO | 89/04887 | A1 | | 6/1989 |
| WO | 01/78573 | A2 | | 10/2001 |
| WO | 2008/000812 | A1 | | 1/2008 |

* cited by examiner

LAUNDRY TREATING APPLIANCE WITH BULKY ITEM DETECTION

BACKGROUND OF THE INVENTION

Laundry treating appliances, such as clothes washers, clothes dryers, refreshers, and non-aqueous systems, may have a configuration based on a rotating drum that defines a treating chamber in which laundry items are placed for treating. The laundry treating appliance may have a controller that implements a number of pre-programmed cycles of operation. The user typically manually selects the cycle of operation from the given pre-programmed cycles. Each pre-programmed cycle may have any number of adjustable parameters, which may be input by the user or may be set by the controller. The controller may set the parameter according to default values, predetermined values, or responsive to conditions within the treating chamber.

SUMMARY OF THE INVENTION

The invention relates to a laundry treating appliance and method for controlling the operation of a laundry treating appliance comprising a treating chamber by determining the presence of a bulky laundry item based on image data of the laundry.

DESCRIPTION OF AN EMBODIMENT OF THE INVENTION

Figure 1:
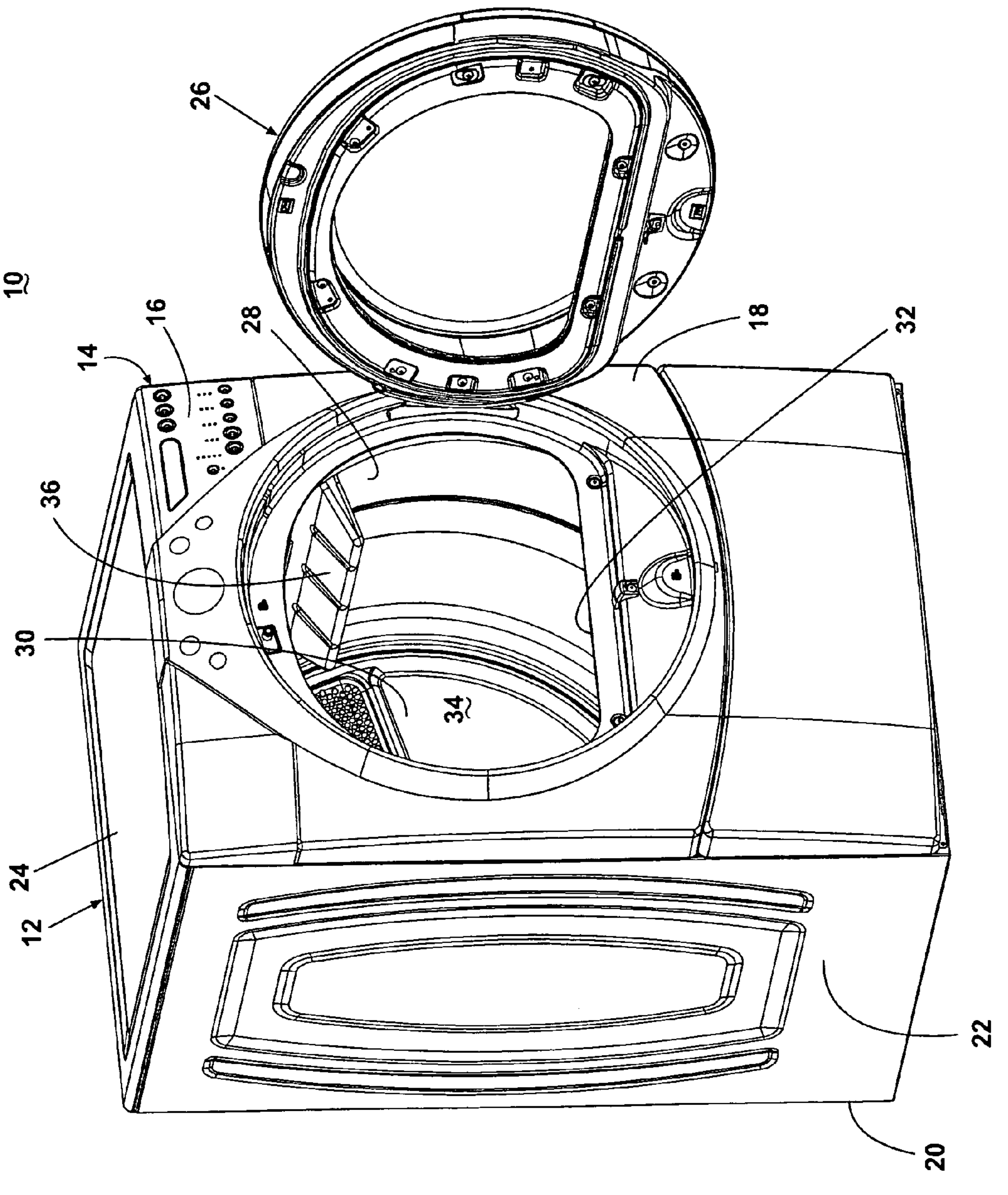
FIG. 1 is a front perspective view of a laundry treating appliance in the form of a clothes dryer with a treating chamber according to one embodiment of the invention.

FIG. 1 illustrates one embodiment of a laundry treating appliance in the form of a clothes dryer 10 according to the invention. While the laundry treating appliance 10 is illustrated as a clothes dryer 10, the laundry treating appliance according to the invention may be any appliance which performs a cycle of operation on laundry, non-limiting examples of which include a horizontal or vertical axis clothes washer; a combination washing machine and dryer; a tumbling or refreshing/revitalizing machine; an extractor; a non-aqueous washing apparatus; and a revitalizing machine. The clothes dryer 10 described herein shares many features of a traditional automatic clothes dryer, which will not be described in detail except as necessary for a complete understanding of the invention.

As illustrated in FIG. 1, the clothes dryer 10 may comprises a cabinet 12 in which is provided a controller 14 that may receive input from a user through a user interface 16 for selecting a cycle of operation and controlling the operation of the clothes dryer 10 to implement the selected cycle of operation.

The cabinet 12 may be defined by a front wall 18, a rear wall 20, and a pair of side walls 22 supporting a top wall 24. A door 26 may be hingedly mounted to the front wall 18 and may be selectively moveable between opened and closed positions to close an opening in the front wall 18, which provides access to the interior of the cabinet.

A rotatable drum 28 may be disposed within the interior of the cabinet 12 between opposing stationary rear and front bulkheads 30 and 32, which collectively define a treating chamber 34, for treating laundry, having an open face that may be selectively closed by the door 26. Examples of laundry include, but are not limited to, a hat, a scarf, a glove, a sweater, a blouse, a shirt, a pair of shorts, a dress, a sock, a pair of pants, a shoe, an undergarment, and a jacket. Furthermore, textile fabrics in other products, such as draperies, sheets, towels, pillows, and stuffed fabric articles (e.g., toys), may be dried in the clothes dryer 10.

The drum 28 may include at least one lifter 36. In most dryers, there are multiple lifters. The lifters 36 may be located along the inner surface of the drum 28 defining an interior circumference of the drum 28. The lifters 36 facilitate movement of the laundry within the drum 28 as the drum 28 rotates.

Figure 2:
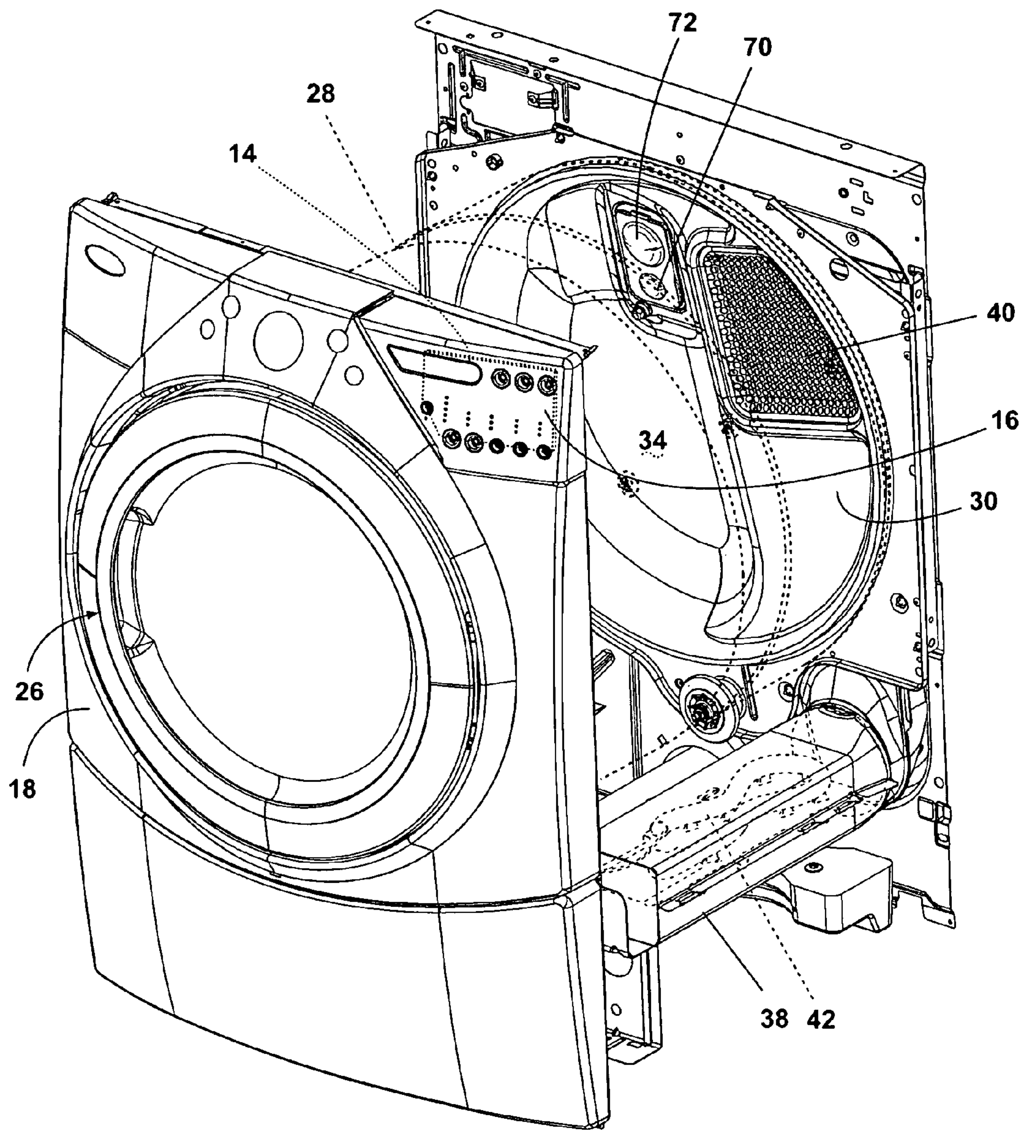
FIG. 2 is a partial perspective view of the dryer of FIG. 1 with portions of the cabinet removed for clarity according to one embodiment of the invention.

Still referring to FIG. 2, an air flow system for the clothes dryer 10 according to one embodiment of the invention will now be described. The air flow system supplies air to the treating chamber 34 and then exhausts air from the treating chamber 34. The supplied air may be heated or not. The air flow system may have an air supply portion that may be formed in part by an inlet conduit 38, which has one end open to the ambient air and another end fluidly coupled to an inlet grill 40, which may be in fluid communication with the treating chamber 34. A heating element 42 may lie within the inlet conduit 38 and may be operably coupled to and controlled by the controller 14. If the heating element 42 is turned on, the supplied air will be heated prior to entering the drum 28.

Figure 3:
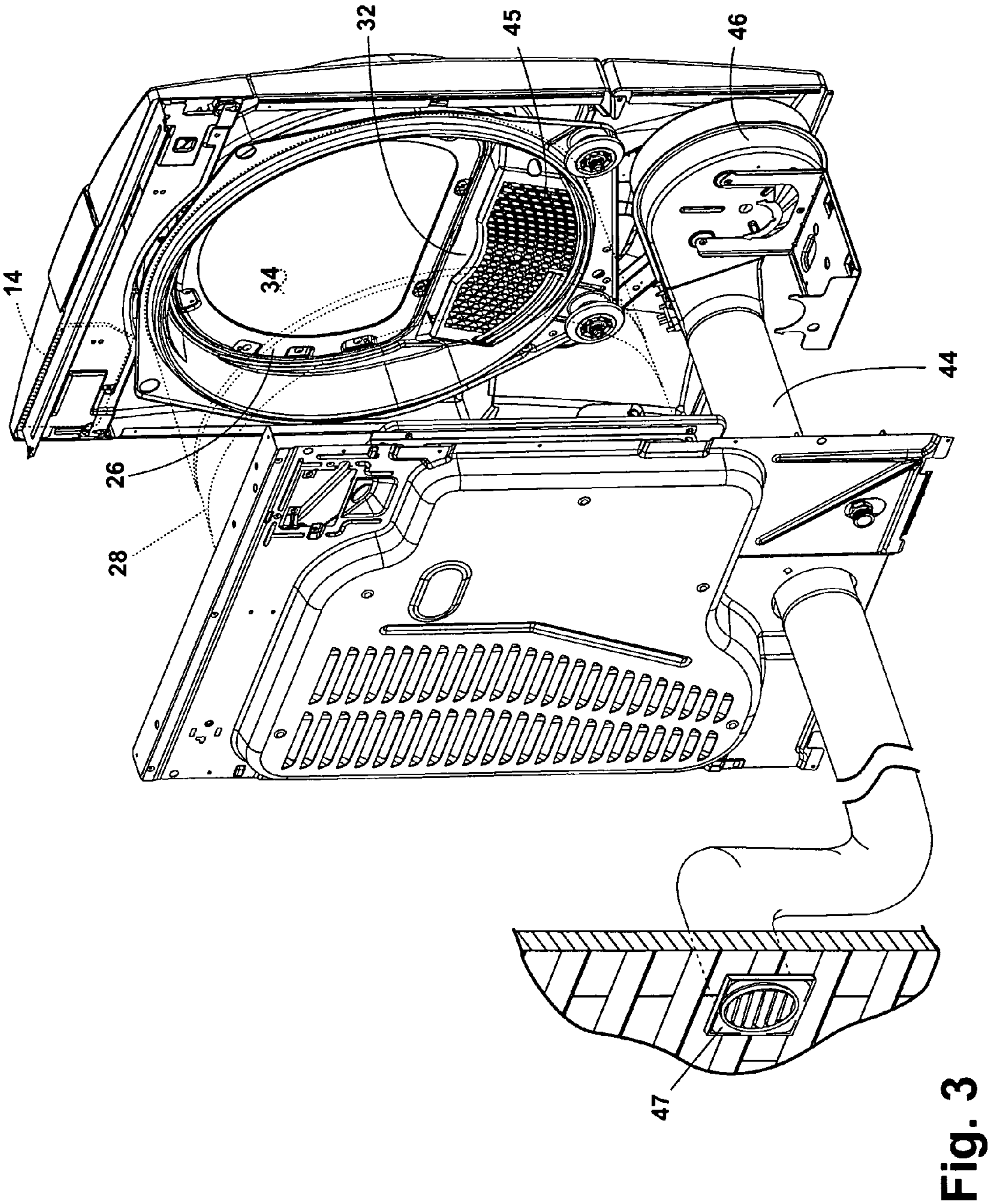
FIG. 3 is second partial perspective view of the dryer of FIG. 1 with portions of the cabinet removed for clarity according to one embodiment of the invention.

Referring to FIG. 3, the air supply system may further include an air exhaust portion that may be formed in part by an exhaust conduit 44 and lint trap 45, which are fluidly coupled by a blower 46. The blower 46 may be operably coupled to and controlled by the controller 14. Operation of the blower 46 draws air into the treating chamber 34 as well as exhausts air from the treating chamber 34 through the exhaust conduit 44. The exhaust conduit 44 may be fluidly coupled with a household exhaust duct 47 or exhausting the air from the drying chamber to the outside.

Figure 4:
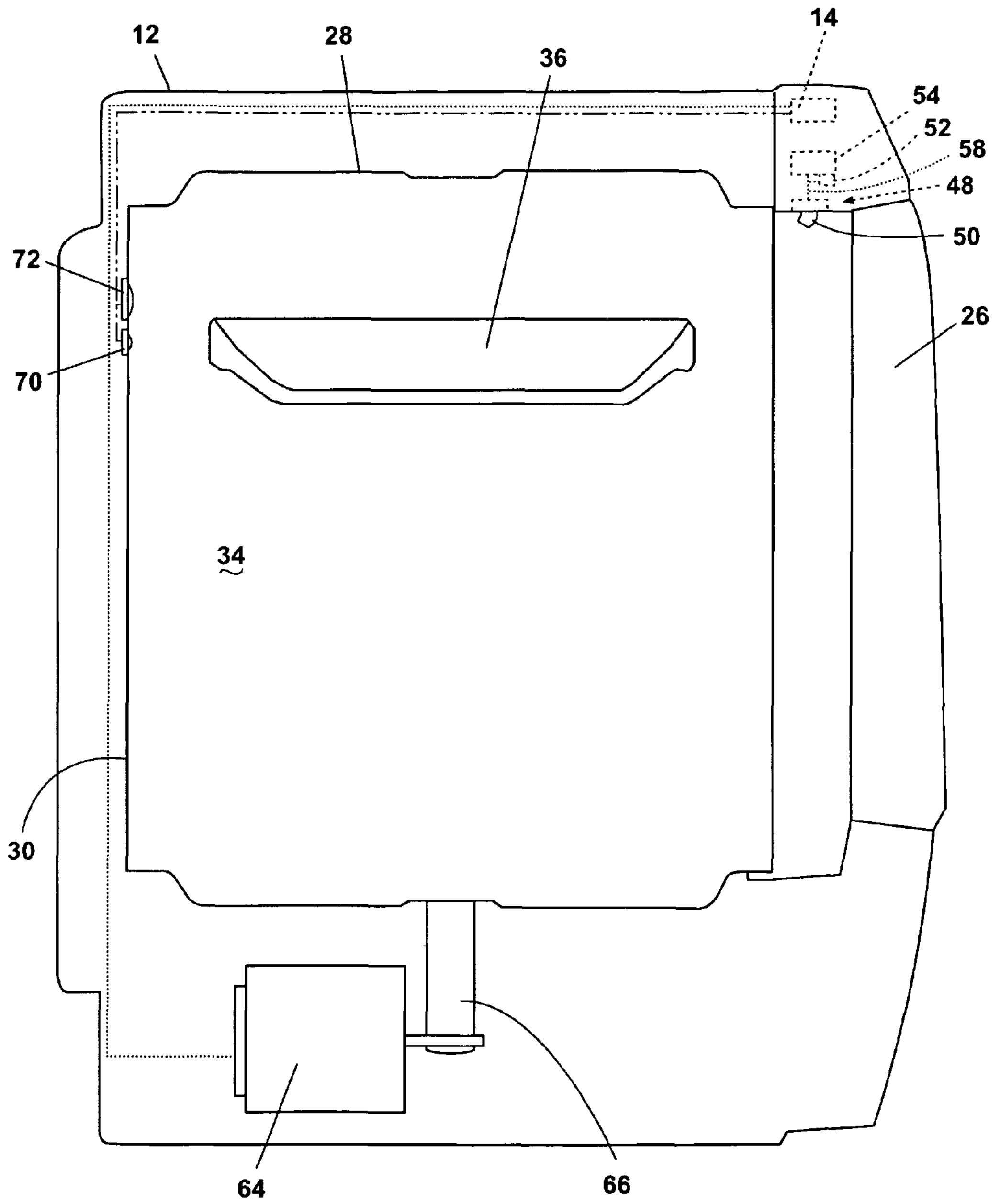
FIG. 4 is a cross-sectional, schematic side view of the dryer of FIG. 1 having an imaging system for imaging the treating chamber the dryer according to one embodiment of the invention.

Referring now to FIG. 4, the clothes dryer 10 may optionally have a dispensing system 48 for dispensing treating chemistries, including without limitation water or steam, into the treating chamber 34, and thus may be considered to be a dispensing dryer. The dispensing system 48 may include a reservoir 54 capable of holding treating chemistry and a dispenser 50 that fluidly couples with the reservoir 54 through a dispensing line 58. The treating chemistry may be delivered to the dispenser 50 from the reservoir 54 and the dispenser 50 may dispense the chemistry into the treating chamber 34. The dispenser 50 may be positioned to direct the treating chemistry at the inner surface of the drum 28 so that laundry may contact and absorb the chemistry, or to dispense the chemistry directly onto the laundry in the treating chamber 34. The type of dispenser 50 is not germane to the invention. A chemistry meter 52 may electronically couple, wired or wirelessly, to the controller 14 to control the amount of treating chemistry dispensed.

As is typical in a clothes dryer, the drum 28 may be rotated by a suitable drive mechanism, which is illustrated as a motor 64 and a coupled belt 66. The motor 64 may be operably coupled to the controller 14 to control the rotation of the drum 28 to complete a cycle of operation. Other drive mechanisms, such as direct drive, may also be used.

The clothes dryer 10 may also have an imaging device 70 to image the treating chamber 34 and/or anything within the treating chamber 34. Exemplary imaging devices 70 may include any optical sensor capable of capturing still or moving images, such as a camera. One suitable type of camera is a CMOS camera. Other exemplary imaging devices include a CCD camera, a digital camera, a video camera or any other type of device capable of capturing an image. That camera may capture either or both visible and non-visible radiation. For example, the camera may capture an image using visible light. In another example, the camera may capture an image using non-visible light, such as ultraviolet light. In yet another example, the camera may be a thermal imaging device capable of detecting radiation in the infrared region of the electromagnetic spectrum. The imaging device 70 may be located on either of the rear or front bulkhead 30, 32 or in the door 26. It may be readily understood that the location of the imaging device 70 may be in numerous other locations depending on the particular structure of the dryer and the desired position for obtaining an image. The location of the imaging device may depend on the type of desired image, the area of interest within the treating chamber 34, or whether the image is to be captured with the drum in motion. For example, if the drum is to be stopped during imaging and the laundry load is of interest, the imaging device 70 is positioned so that its field of view includes the bottom of the drum 28. If the imaging is done while the drum is moving and the motion of the laundry is important, the imaging device 70 is positioned so that its field of view includes the side and center of the drum 28 so that the laundry can be imaged as it is lifted and tumbled. The imaging device may also be placed such that the entire or substantially the entire treating chamber is within the field of view of the imaging device. There may also be multiple imaging devices, which may imaging the same or different areas of the treating chamber 34.

The clothes dryer 10 may also have an illumination source 72. The type of illumination source 72 may vary. In one configuration, the illumination source 72 may be a typical incandescent dryer light which is commonly used to illuminate the treating chamber 34. Alternatively, one or more LED lights may be used in place of an incandescent bulb. The illumination source 72 may also be located behind the rear bulkhead 30 of the drum 28 such that the light shines through the holes of the air inlet grill 40. It is also within the scope of the invention for the clothes dryer 10 to have more than one illumination source 72. For example, an array of LED lights may be placed at multiple positions in either bulkhead 30, 32.

The illumination source 72 can be located on the same side of the drum 28 as the imaging device 70, as illustrated in FIG. 4, or located on a different side of the drum 28. When the illumination source 72 is located on the same side of the drum 28 as the imaging device 70, the imaging device 70 may detect the light that may be reflected by the drum 28 and the laundry load. Image analysis may then be used to isolate the drum 28 from the laundry load. When the illumination source 72 is located on a side of the drum 28 opposite the imaging device 70, the imaging device 70 detects only the light from the illumination source 72 that is not blocked by the laundry load. At any instant in time, a given location in an image will be dark or light depending on whether or not laundry is present at that location.

The illumination generated by the illumination source may vary, and may well be dependent on the type of imaging device. For example, illumination may be infrared if the imaging device is configured to image the infrared spectrum. Similarly, the illumination may be visible light, if the imaging device is configured to image the visible spectrum.

Figure 5:
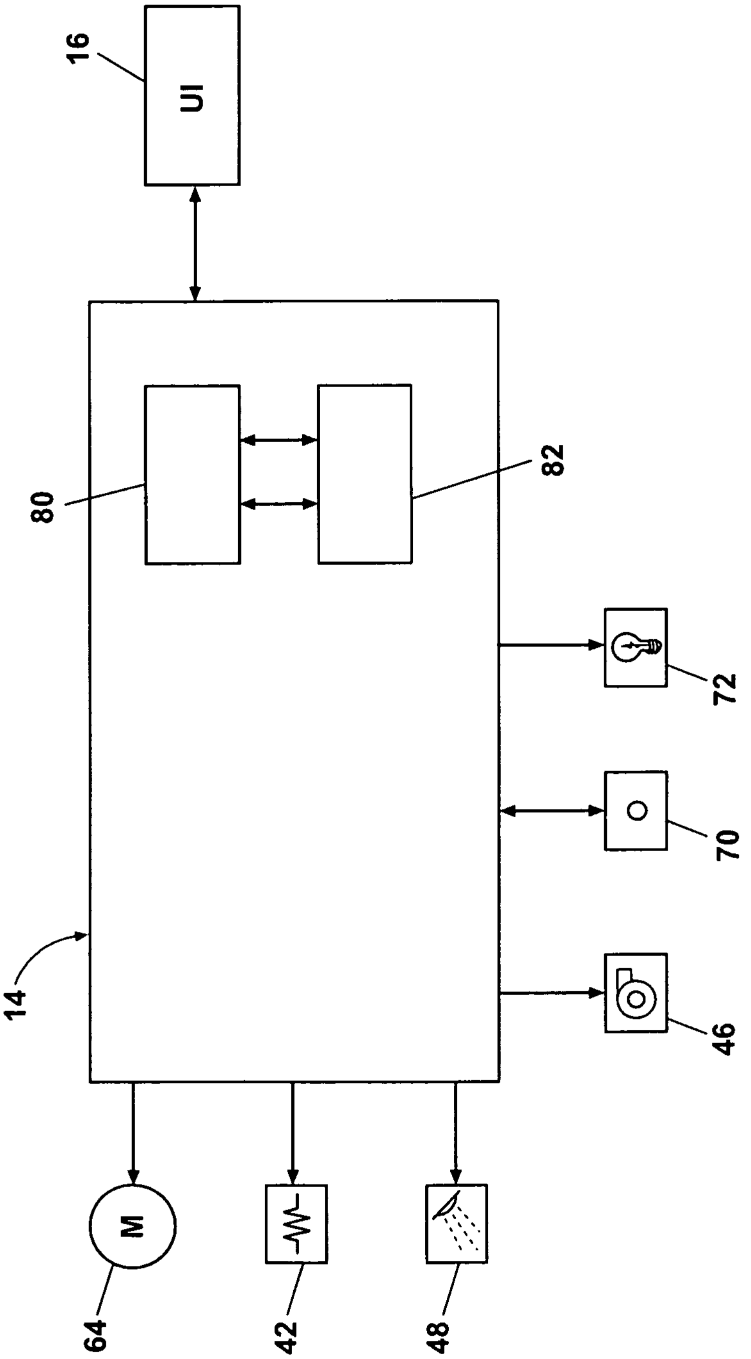
FIG. 5 is a schematic representation of a controller for controlling the operation of one or more components of the clothes dryer of FIG. 1 according to one embodiment of the invention.

As illustrated in FIG. 5, the controller 14 may be provided with a memory 80 and a central processing unit (CPU) 82. The memory 80 may be used for storing the control software that is executed by the CPU 82 in completing a cycle of operation using the clothes dryer 10 and any additional software. The memory 80 may also be used to store information, such as a database or table, and to store data received from the one or more components of the clothes dryer 10 that may be communicably coupled with the controller 14.

The controller 14 may be communicably and/or operably coupled with one or more components of the clothes dryer 10 for communicating with and controlling the operation of the component to complete a cycle of operation. For example, the controller 14 may be coupled with the heating element 42 and the blower 46 for controlling the temperature and flow rate through the treatment chamber 34; the motor 64 for controlling the direction and speed of rotation of the drum 28; and the dispensing system 48 for dispensing a treatment chemistry during a cycle of operation. The controller 14 may also be coupled with the user interface 16 for receiving user selected inputs and communicating information to the user.

The controller 14 may also receive input from various sensors 84, which are known in the art and not shown for simplicity. Non-limiting examples of sensors 84 that may be communicably coupled with the controller 14 include: a treating chamber temperature sensor, an inlet air temperature sensor, an exhaust air temperature sensor, a moisture sensor, an air flow rate sensor, a weight sensor, and a motor torque sensor.

The controller 14 may also be coupled with the imaging device 70 and illumination source 72 to capture one or more images of the treating chamber 34. The captured images may be sent to the controller 14 and analyzed using analysis software stored in the controller memory 80 to determine the presence of a bulky laundry item in the treating chamber 34. The controller 14 may use the determined presence of a bulky laundry item to set one or more operating parameters to control the operation of at least one component with which the controller 14 is operably coupled to complete a cycle of operation. Some non-limiting examples of bulky laundry items may include comforters, sleeping bags, jackets, down jackets, blankets, stuffed fabric articles (e.g., toys), work wear (e.g., heavy duty or stiff cloth work wear such as is worn in the construction industry), etc. A bulky item may be defined as an item that utilizes a large portion of the available space within the drying chamber 34, such as a comforter. A bulky item may further be defined as an item having a volume and/or shape that does not substantially change during the laundry treating process, such as a stuffed fabric article.

While controlling the operation of the clothes dryer 10 is presented in terms of the determined presence of a bulky laundry item, it is understood that this includes a positive or negative determination. Thus, the determined absence of a bulky laundry item (a negative determination of the presence of a bulky laundry item) may be used to set at least one parameter of the treating cycle of operation in accordance with the present invention.

The previously described clothes dryer 10 provides the structure necessary for the implementation of the method of the invention. Several embodiments of the method will now be described in terms of the operation of the clothes dryer 10. The embodiments of the method function to automatically determine the presence of a bulky laundry item and control the operation of the clothes dryer 10 based on the determination.

The presence of a bulky laundry item in the treating chamber 34 may be determined by using the imaging device 70 to obtain one or more images over time of the contents of the drum 28 as it is rotating or as it is static. The one or more images can be taken as the drum 28 is being loaded with laundry, or when the laundry load is completed loaded into the drum 28. For some determinations, a single image is all that needs to be analyzed. For other determinations, multiple images over time may need to be analyzed. The presence of a bulky laundry item in the treating chamber 34 may then be used to control the operation of the clothes dryer 10.

Controlling the operation of the clothes dryer 10 based on the presence of a bulky laundry item in the treating chamber 34 may include setting at least one parameter of a cycle of operation including a rotational speed of the drum 28, a direction of rotation of the drum 28, a temperature in the treating chamber 34, an air flow through the treating chamber 34, a type of treating chemistry, an amount of treating chemistry, a start or end of cycle condition and a start or end cycle step condition.

Setting a start or end of cycle condition may include determining when to start or end a cycle of operation. This may include signaling the controller 14 to immediately start or end a cycle of operation or setting a time at which to start or end a cycle of operation.

Setting a start or end of cycle step condition may include determining when to start a step within a given operating cycle or when to end a step within a given operating cycle. This may include signaling the controller 14 to immediately transition from one cycle step to another or setting a time at which to transition from one step to another within a given operating cycle. Examples of cycle steps include rotation with heated air, rotation without heated air, treatment dispensing, and a wrinkle guard step.

For laundry treating appliances other than clothes dryers, parameters of a cycle of operation that may be set based on the determined motion state may also include a rotational speed of an agitator, a direction of agitator rotation, and a wash liquid fill level.

Figure 6:
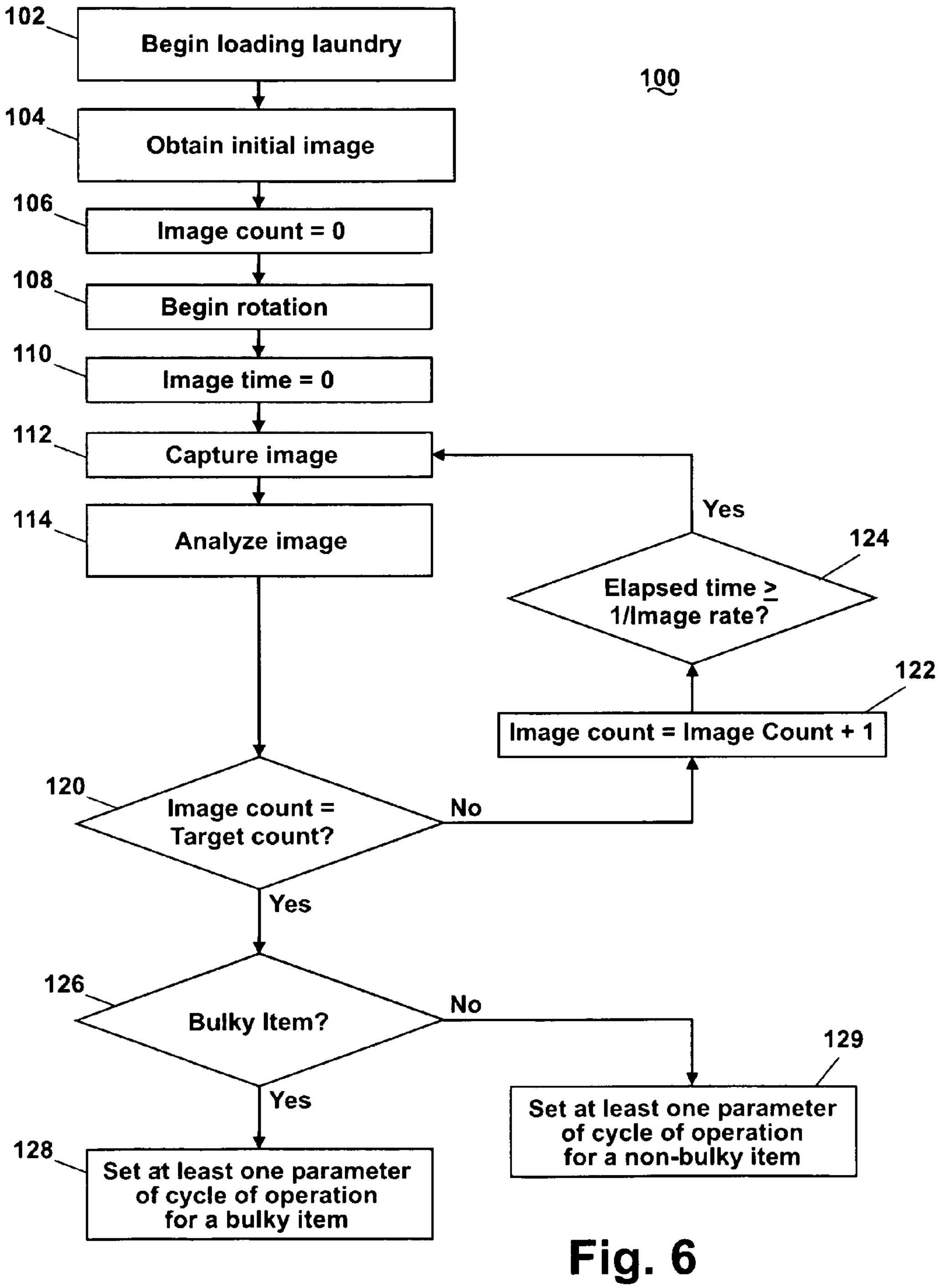
FIG. 6 is a flow chart illustrating a method for determining the presence of a bulky item in a clothes dryer according to a second embodiment of the invention.

Referring to FIG. 6, a flow chart of one method 100 of determining the presence of a bulky item and controlling the operation of the clothes dryer in accordance with the determined presence of a bulky item is shown in accordance with the present invention. The sequence of steps depicted is for illustrative purposes only, and is not meant to limit the method 100 in any way as it is understood that the steps may proceed in a different logical order, additional or intervening steps may be included, or described steps may be divided into multiple steps, without detracting from the invention.

The method 100 may be executed by the controller 14 during a treatment cycle, which includes drying, of the clothes dryer 10. The method 100 may start at step 102 while the user is loading the clothes dryer 10 with one or more articles to form the laundry load, or when the laundry load is loaded into the clothes dryer 10. The method 100 may be initiated automatically when the user opens or closes the door 26, or at the start of a user selected operating cycle. Step 104 is an optional step in which the controller 14 obtains an initial image of the laundry load without rotation of the drum. The initial image may be used to determine load parameters such as the volume, size, color, or fabric type of the load, all of which may be used to set various parameters of the cycle.

In the next step 106, the image count of a counter, which tracks the number of images taken, is set to 0. Ultimately, the number of images counted by the counter may be used to determine when to terminate the imaging of the laundry.

Rotation of the drum is initiated at step 108. The speed of rotation of the drum 28 may be increased until it reaches a predetermined speed of rotation. The predetermined speed of rotation may be determined by the controller 14 based on the selected operating cycle and the operating parameter settings. For example, the predetermined speed of rotation may be selected such that it enhances the movement of laundry to enhance the determination of the presence of a bulky item or to improve the surface area exposure of the laundry.

When the drum speed reaches the predetermined speed, the image time may be set to 0 at step 110, and the imaging device 70 may capture an image of all or some portion of the treating chamber 34 at step 112. Alternatively, the image time may be set to 0 in step 110 after a predetermined amount of time has elapsed or after a predetermined step in a cycle of operation.

In step 114, the captured image undergoes image analysis. The captured image may be sent to the controller 14 for image analysis using software that is stored in the memory 80 of the controller 14. It is also within the scope of the invention for the imaging device 70 to have a memory and a microprocessor for storing information and software and executing the software, respectively. In this manner, the imaging device 70 may analyze the captured image data and communicate the results of the analysis with the controller 14.

In one exemplary type of image analysis, the load image is isolated from the background, i.e. the dryer drum 28, of the captured image. Isolating the load image from the background may include identifying the load image within the image or extracting one or more portions of the load image from the image. Regardless of how the load image is isolated from the background, the load image may be used to obtain information relating to the color, size, shape and location of the laundry load within the drum 28. For example, the load image may be used to calculate the edge, volume, size, area, perimeter, center of mass, radius and major or minor axis of the load using known methods. In the present method 100, the load image is used to determine the presence or absence of a bulky item in the load. There are many suitable ways to determine the presence or absence of a bulky item, examples of which will be detailed below.

In the next step 120, the controller 14 determines if the image count equals the target count. If the image count is less than the target count, the image count is increased by 1 in step 122. In step 124, the time elapsed since capturing the last image is monitored. Once the elapsed time is equal to or greater than one divided by the imaging rate, the method returns to step 112, and steps 112 through 120 are repeated.

The image count is selected such that a sufficient number of images may be captured and analyzed to determine the surface area of laundry. The image rate is selected such that a predetermined number of images may be captured within a predetermined amount of time, and may be set based on empirical data on the amount of time needed to accurately determine the presence of a bulky item.

If the image count equals the target count, then the presence of a bulky item is determined in step 126 by using the results of the image analysis performed in step 114. From the determined presence or absence of a bulky item, at least one parameter of a cycle of operation is set in step 128 or 129, respectively, to control the operation of the clothes dryer 10. Examples of parameters that may be set include a rotational speed of a drum, a direction of drum rotation, a temperature in the treating chamber, an air flow through the treating chamber, a type of treating chemistry, an amount of treating chemistry, a start of cycle condition, an end of cycle condition, a start of cycle step condition, an end cycle step condition, a rotational speed of an agitator, a direction of agitator rotation, and a wash liquid fill level.

Figure 7:
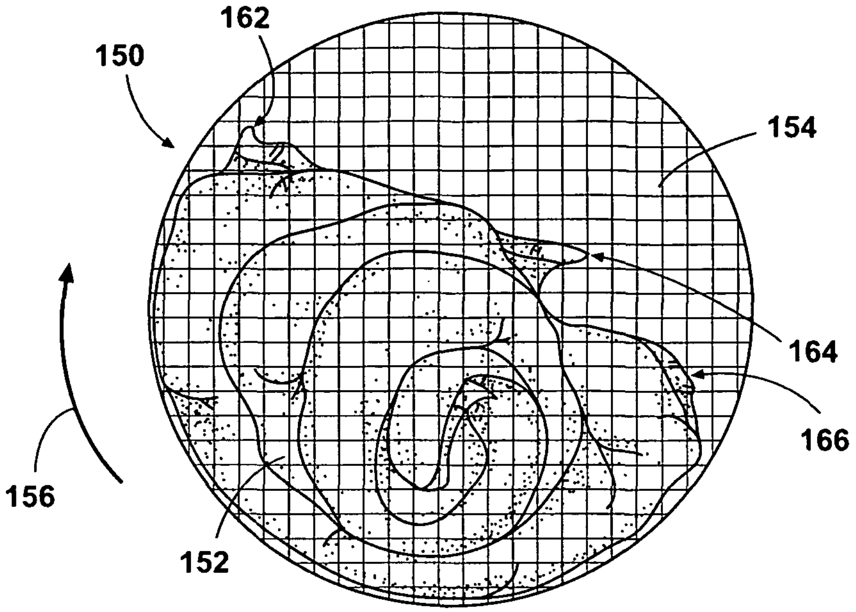
FIG. 7 is a schematic representation of a first captured image of a laundry load according to the second embodiment of the invention.

FIG. 7 is a schematic illustrating an example of a first captured image 150 depicting a load in the form of an item 152, which may be a bulky item, moving within the drum 28 as it is rotating clockwise (as indicated by the arrow 156), that may be captured according to step 112 of the method 100 illustrated in FIG. 6. The image 150 is a schematic representation of a two-dimensional projection of the field of view of the imaging device 70, which will vary depending on the location of the imaging device 70. Depending on the field of view of the imaging device 70, the background 154 may include portions of one or more components of the clothes dryer 10 including the rear and front bulkheads 30 and 32, the door 26 and the drum 28.

Figure 8:
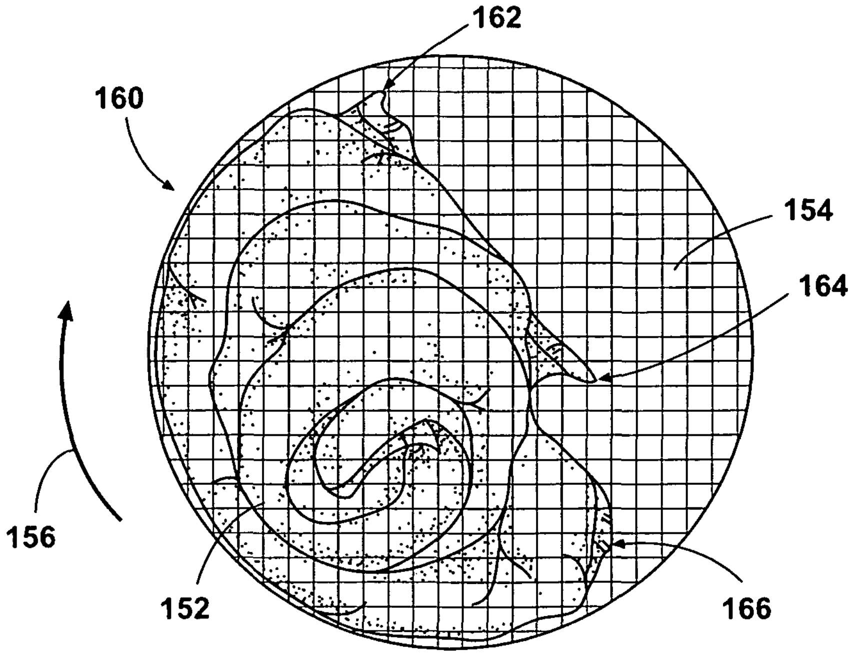
FIG. 8 is a schematic representation of a second captured image of a laundry load according to the second embodiment of the invention.

FIG. 8 illustrates a second captured image 160 of the load 152 that may be captured according to step 112 of the method 100 illustrated in FIG. 6 at some point in time after the image 150. As illustrated, the item 152 may have shifted as compared with the first image 150 as the drum 28 is rotating clockwise relative to the background 154 as indicated by the arrow.

Figure 9:
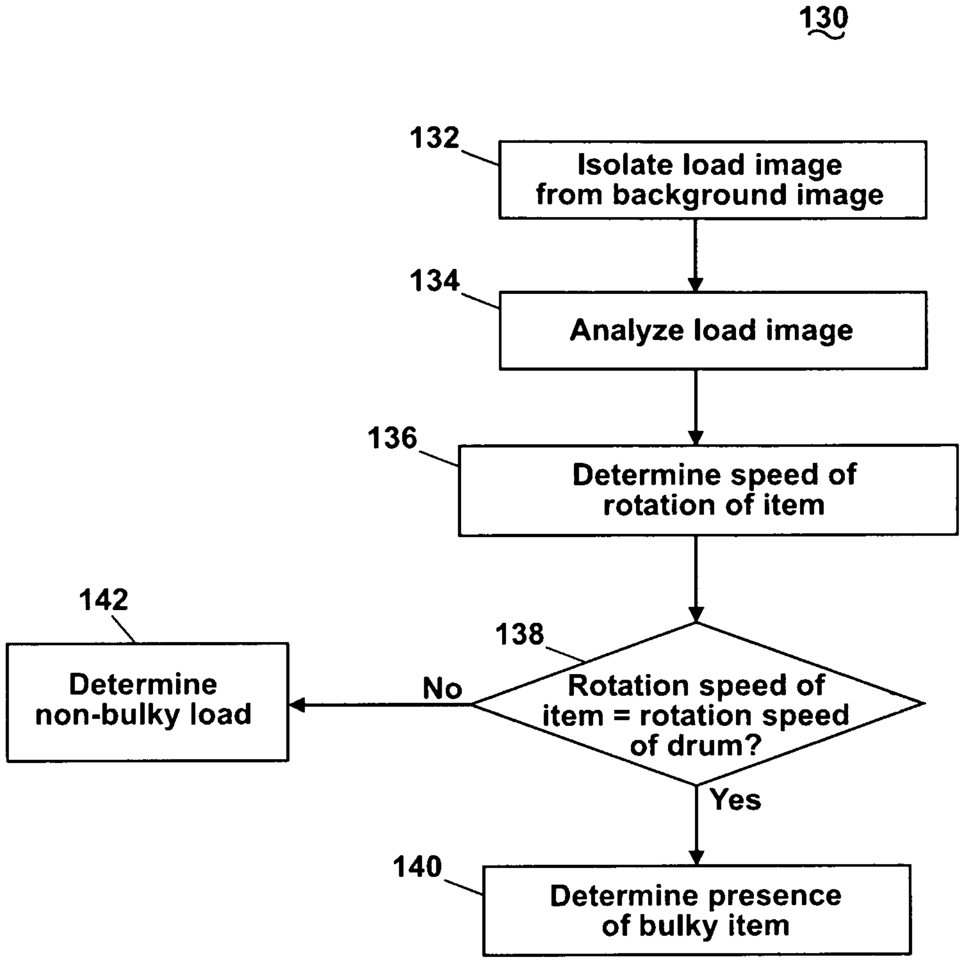
FIG. 9 is a flow chart illustrating an exemplary method for image analysis of a captured image according to a third embodiment of the invention.

Referring to FIG. 9, a flow chart of one exemplary method 130 for image analysis is shown in accordance with the present invention. The method 130 may be executed by the controller 14 during step 114 of method 100 shown in FIG. 6. The sequence of steps depicted is for illustrative purposes only, and is not meant to limit the method 130 in any way as it is understood that the steps may proceed in a different logical order, additional or intervening steps may be included, or described steps may be divided into multiple steps, without detracting from the invention. In several instances, the method 130 is described with reference to the first and second images 150, 160 (FIGS. 7 and 8) for purposes of illustration. While only two images 150, 160 are shown herein, it is understood that more or less images could be analyzed to determine the presence of a bulky item.

Method 130 begins with step 132, in which the load 152 is isolated from the background 154. There are several methods for isolating the load from the background depending on the illumination configuration, drum properties, and the load. Isolating the load image from the background may include identifying the load image within the image or relative to the background. Alternatively, isolating the image from the background may include extracting one or more portions of the load image from the captured image.

For example, in the case of an illumination configuration where the illumination source 72 is located on the same side of the drum 28 as the imaging device 70 (FIG. 4), techniques such as edge detection, color segmentation, and deviation from a known background image may be used to isolate the load from the background. Edge detection may be calculated using known methods. Color segmentation involves isolating the load from the background based on differences in the saturation, hue and/or luminance of objects in the image. Deviation from a known background image may require the surface of the dryer drum 28 to have optically detectable features to aid in the separation of the load from the background image of the drum 28.

In step 134, once the load 152 is isolated from the background 154, the load image may be analyzed to obtain information about the movement of the load within the drum 28. This may include detecting the edge of the load 152 to determine one or more identifiable features of of the load 152. The change in the location of the identifiable features relative to the background 154 may be used to determine a speed of rotation of the load 152. The speed of rotation of the the load 152 may be compared to the known speed of the drum 28 to determine if the item 152 is a bulky item.

If the item 152 is a bulky item, it may be moving within the drum 28 at approximately the same speed as the drum 28. If the item 152 is formed from multiple items, the individual items may not all be moving uniformly within the drum 28 at the same speed as the drum 28. The items may be of different sizes and fabric types, which may cause them to move and tumble within the drum 28 at different speeds relative to each other and relative to the drum 28 as a result of frictional interaction between the items.

An example method by which the movement of the edge of the bulky item 152 may be determined may include dividing the image 150 into multiple segments to create a grid composed of multiple grid elements overlying the image 150. The location, number, shape and size of the grid elements may vary depending on a variety of factors, including, without limitation, the shape of the image 150, the shape of the drum 28 and the location of the imaging device 70. It is within the scope of the invention for the image 150 and applied grid to have any regular or irregular shape.

The grid may be a related to a naturally occurring structure in the imaging system, such as the grid formed by the pixels of a sensor for the imaging device 70. Alternatively, it may be represented by the data points forming the image 150, 160, which may be thought of as pixels of the image. In most digital images, the image is comprised of a series of pixels arranged in rows and columns. Whether the sensor pixels or image pixels are used to form the grid, each grid element may be formed by one or a more pixels.

One benefit of using a grid in conjunction with an imaging device 70 that is a CCD or CMOS camera is that the CCD or CMOS cameras have a sensor comprising multiple pixels, which form a grid-like structure. A single pixel or a grouping of pixels may be used to form a grid element.

For example, the images 150 and 160 in FIGS. 7 and 8 may be digital images wherein the data points forming the image are pixels which may be used to form a grid to analyze the images 150 and 160. A group of pixels corresponding to the edge of the item 152 in one or more locations along the edge of the item 152 may be used to identify one or more features for determining the speed of rotation of the item 152. The position of each pixel in the group relative to the other pixels in the group may be used to form a pixel pattern that may be used to identify an edge feature of the item 152. The pixel pattern and the relative location of the pixels forming the pattern in the image 150 may be stored in an edge feature database accessible by the controller 14. The edge feature may be determined mathematically using an appropriate algorithm or function. Non-limiting examples of an edge feature include: an entire edge, a portion of an edge, or a prominent edge feature. For purposes of this description, multiple prominent edge features will be used.

For example, edge features 162, 164 and 166 may be identified as prominent edge features in the image 150. The prominent edge features 162, 164 and 166 may be identified by analyzing the pattern of pixels forming each edge feature 162, 164 and 166. The movement of these prominent edge features 162, 164 and 166 relative to the background 154 may be used to determine the speed of rotation of the item 152.

At some predetermined later point in time, illustrated in FIG. 8, the edge of the item 152 may be analyzed to find the edge features 162, 164 and 166 previously identified in FIG. 7. This may include identifying a pixel pattern in the image 160 illustrated in FIG. 8 corresponding to the pixel pattern identified previously in FIG. 7. The relative location of the pixels forming the edge feature in the image 160 may then be stored in the edge feature database. Analysis of the edge features 162, 164 and 166 between images may include using one or more mathematical functions or algorithms. Alternatively, the edge features 162, 164 and 166 may be analyzed using pattern recognition techniques.

In step 136, the change in relative location of the edge features 162, 164 and 166 between images 150 and 160 illustrated in FIGS. 7 and 8 and the elapsed time between the images 150 and 160 may be used to determine the speed at which the item 152 is rotating within the drum 28. The determined speed of the item 152 may be stored in a memory accessible by the controller 14 and the imaging device 70. The rotation speed of the item 152 may be compared to the known speed of the drum 28 in step 138. The speed of the drum 28 may be determined using known methods such as using the current or voltage input to the motor 64 or based on a sensor reading.

If the speed of rotation of the edge of the item 152 is generally the same as the drum speed or is within some predetermined range of the drum speed, the controller 14 may determine that the item 152 is a bulky item in step 140. If the speed of rotation of the edge of the item 152 is not the same as the speed of rotation of the drum 28 or falls outside a predetermined range of the drum speed, the controller 14 may determine that the load item is not a bulky item in step 142. The determination of the presence of a bulky or non-bulky load in steps 138-142, may coincide with the determination of a bulky item in step 126.

Alternatively, rather than comparing the determined speed of the item 152 to the known speed of the drum 28, the speed of the item 152 may be determined by comparing the movement of the item 152 to the movement of the drum 28 in step 138. The movement of the drum 28 may be determined based on the change in relative location of an identifiable feature of the drum 28 between images. An identifiable feature of the drum 28 may include a lifter 36 or one or more areas of the drum 28 may contain an optically identifiable material, such as reflective paint. If the change in relative location of an identifiable feature of the item 152 is similar to the change in relative location of an identifiable feature of the drum 28, within a predetermined range, the controller 14 may determine that the item 152 and drum 28 are rotating at generally the same speed, indicative of the presence of a bulky item.

While the method 130 is described only in the context of two images, any number of images may be used. The number of pixels used to identify an edge feature and the number of edge features analyzed to determine the movement of the item 152 in the drum 28 may vary. The image rate may be set such that the images are captured within a small time-frame to minimize any errors that may occur as a result of shifting of the item 152 within the drum 28. Shifting of the item 152 within the drum 28 may result in a change in the shape of the edge, edge portion, or prominent edge features, which may impair the ability of the controller 14 to identify the same edge feature in consecutive images.

Figure 10:
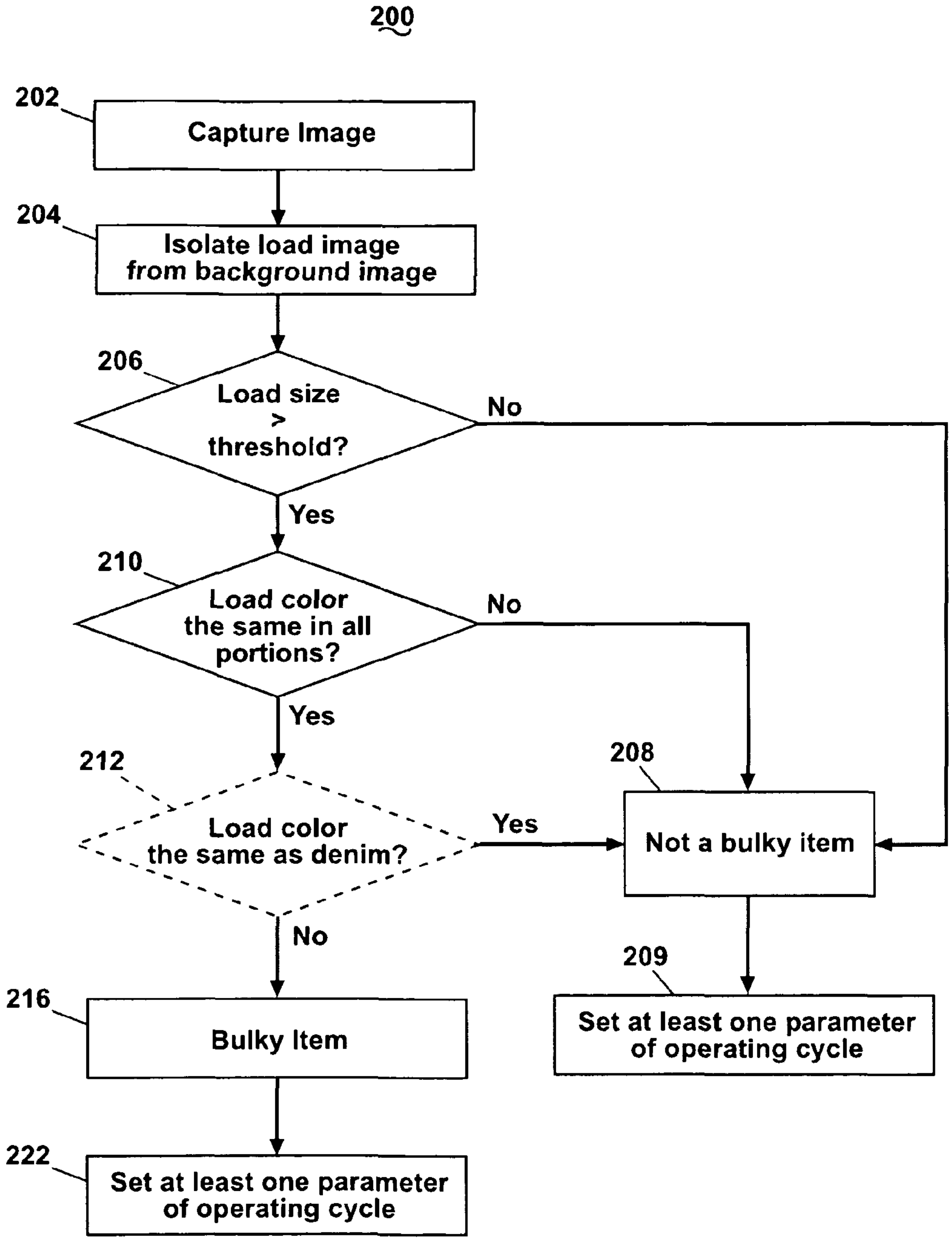
FIG. 10 is a flow chart illustrating a method for determining the presence of a bulky item in a clothes dryer according to a fourth embodiment of the invention.

Referring to FIG. 10, a flow chart of one method 200 of determining the presence of a bulky item and controlling the operation of the clothes dryer in accordance with the determined presence of a bulky item is shown in accordance with another embodiment of the invention. According to the method 200, the presence of a bulky item may be determined by analyzing the size and color signature of the load. The sequence of steps depicted is for illustrative purposes only, and is not meant to limit the method 200 in any way as it is understood that the steps may proceed in a different logical order, additional or intervening steps may be included, or described steps may be divided into multiple steps, without detracting from the invention.

The method 200 may be executed by the controller 14 during a treatment cycle, including drying, of the clothes dryer 10. The method 200 starts with assuming that the user has opened the door 26 and has placed the laundry inside the drum 28. In step 202, the imaging device 70 may be used to capture an image of some portion of the treating chamber 34. Step 202 may be initiated automatically by the controller 14 or manually by the user. For example, step 202 may be initiated once the door 26 is closed. Alternatively, the drum 28 may rotate several times prior to initiating step 202.

The image captured in step 202 may be sent to the controller 14 for image analysis using software that is stored in the memory 80 of the controller 14. It is also within the scope of the invention for the imaging device 70 to have a memory and a microprocessor for storing information and software and executing the software, respectively. In this manner, the imaging device 70 may analyze the captured image data and communicate the results of the analysis with the controller 14.

In step 204, the load image may be isolated from the image as described previously to identify the load within the image. Load separation techniques include edge detection, color segmentation and deviation from a known background. There are several methods for separating the load from the background depending on the illumination configuration, drum properties, and the load. Isolating the load image from the background may include identifying the load image within the image or relative to the background. Alternatively, isolating the image from the background may include extracting one or more portions of the load image from the captured image.

In the next step 206, the size of the load within the treating chamber 34 may be determined. This may include determining if the load occupies some amount of space in the treating chamber 34 greater than some predetermined threshold value. If the load occupies some amount of space less than a predetermined threshold value, it may be determined in step 208 that the load is not a bulky item and one or more operating parameters may be set in accordance with a non-bulky load in step 209. If the load occupies some amount of space greater than or equal to the predetermined threshold value, then the method moves to step 210.

Step 210 involves determining the color signature of the load. The color signature may be one or a grouping of numerical values that represent a specific color. Most color-based imaging systems use one of several standardized color spaces. For example, RGB (Red, Green, Blue) is a well known color space where each of the colors are represented by a numerical value for the red, blue, and green components for the color. Thus, any color may be uniquely identified with three numerical values. Similar systems may be used for grayscales if color is not an issue. Items having more than one color, such as stripes, may have a color signature that is an average or weighted-average of the observed colors. Regardless of what system is used, a unique color signature may be created for one or more portions of the load.

If it is determined in step 210 that the color signature is generally the same in all or some part of the analyzed portions of the load image, it may be determined that the load is a bulky item in step 216 and one or more operating parameters may be set in step 222. If the color signature is not generally the same in the analyzed portions of the load image, it may be determined in step 208 that the load is not a bulky item. If it is determined that the item is not a bulky item, one or more operating parameters may be set in step 209 according to the determined absence of a bulky item.

Alternatively, if it is determined that the load color signature is generally the same in all portions of the load image in step 210, the method 200 may move to an optional step 212. The optional step 212 may be useful in distinguishing between bulky items, such as a comforter or pillow and a large load of similarly colored items, such as a load of denim. In step 212, the color signature determined in step 210 may be compared to the known color signatures for denim items. The color signatures for various colors of denim may be determined empirically and stored in a database or look-up table accessible by the controller 14. If the color signature determined in step 210 is generally the same as a known color signature for denim, it may be determined in step 208 that the load is not a bulky item. If the color signature determined in step 212 is not the same as a known color signature for denim, it may be determined that the load is a bulky item in step 216 and one or more operating parameters may be set accordingly in step 222.

It should be noted that denim is merely an example of one type of load that has the same color and is not a bulky item. Other examples are towels and whites. The color signature for known non-bulky loads having a common color may also be compared to the detected color signature.

Figure 11:
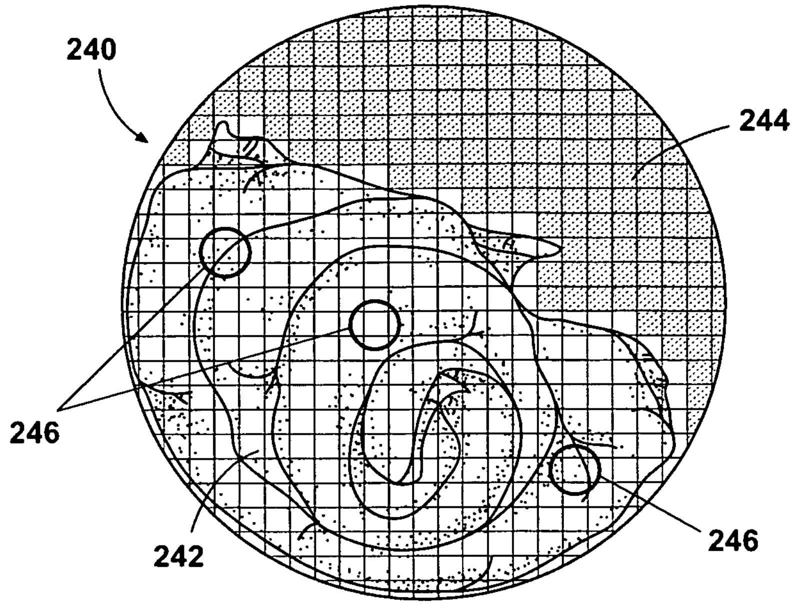
FIG. 11 is a schematic representation of a captured image of a laundry load for analysis according to the method illustrated in FIG. 10.

FIG. 11 is a schematic illustrating an image 240 depicting a load in the form of an item 242 that may be a bulky item, within the drum 28, that may be captured according to step 202 of the method 200 illustrated in FIG. 10. The image 240 is a schematic representation of a two-dimensional grid that may be applied to the image 240. The grid may be a function of the image, such as the pixel arrangement in a digital image, a function of the imaging sensor, such as a CMOS or CCD sensor having an arrangement of pixels, or a grid applied in the image analysis process. Regardless of how the grid might be projected onto the image, the grid may be used to analyze the relative location within the treating chamber. Additionally, in the case of an imaging device having a known filed of view relative to the treating chamber, the grid may be used to represent the physical location of the treating chamber.

For purposes of this description, each grid element will be referred to as a pixel, with the understanding that each grid element may be one pixel, a combination of pixels, or structures other than pixels.

An example of the use of the method 200 for determining the presence of a bulky item will now be described with reference to FIG. 11. The item 242 may be isolated from a background 244 in the image 240 according to known methods such as edge detection, for example, in step 204 of the method 200 illustrated in FIG. 10. Once the item 242 is isolated from the background 244, the pixels corresponding to the item 242 and the background 244 in the image 240 may be identified. For the purposes of illustration, the pixels in FIG. 11 corresponding to the background 244 in the image 240 are shaded grey.

In step 206, determining if the size of the load is larger than a predetermined threshold value may include several methods. For example, the ratio of the number of pixels corresponding to the item 242 to the number of pixels corresponding to the background 244 may be used to determine the relative size of the item 242. The larger the size of the item relative to the amount of space in the treating chamber 34, the greater the ratio. In another example, simply determining the number of pixels unoccupied by the item 242 may be used.

In step 210, analyzing the color signature of the item 242 may involve analyzing all or some portion of the pixels corresponding to the item 242. For example, the color signature of the item 242 at a predetermined number of locations 246 within the image 240 corresponding to the item 242 may be determined. The color signatures from the item areas 246 within the detected edges of the item 242 may be compared to determine if they are indicative of the item 242 having a single color signature. If the item 242 has a single color signature, this may indicate that the load is a large load, as determined in step 206, corresponding to a single item, which may indicate that the load is a bulky item, such as a comforter. If the areas 246 have different color signatures, this may indicate that the load is large, as determined in step 206, but consists of multiple items, not a bulky item.

As discussed above, the color signature may be a grouping of numerical values that represent a specific color. For example, RGB (Red, Green, Blue) is a well known color space where each of the colors are represented by a numerical value for the red, blue, and green components for the color. For example, a particular color of blue may be represented by the numerical values 22, 61 and 170 in the RGB color space. In another example, the item 242 may have a blue color represented by the values 22, 61 and 170 in the RGB color space and a red color represented by the values 249, 69, 103. The color signature of the item 242 may be a weighted average for each value in the RGB color space. If the numerical values for the areas 246 are within a predetermined range of values, it may be determined that the item 242 has a single color signature, indicative of a bulky load.

In the optional step 212, if it is determined that the item 242 has a single color signature, the determined color signature may be compared to the color signatures of different colors of denim that may be stored in a database or look-up table accessible by the controller 14. For example, the RGB color space values for different colors of denim can be stored in a database and compared to the determined color signature of the item 242. If the color signature of the item 242 matches any of the denim signatures within the database, it may be determined that the large load identified in step 206 is a large load of denim, not a bulky item.

Distinguishing between a bulky item and a large load of such as denim, towels and whites, for example, may be difficult because individual articles may have a very similar color signature. This may lead to an incorrect determination of a bulky item in step 210. The optional step 212 may increase the ability of the method 200 to distinguish between a large load consisting of multiple items, such as denim or whites, and a bulky item, such as a comforter. The optimal operating parameters for a large load of such items may be very different from the optimal drying parameters for a bulky item such as a comforter, therefore distinguishing between these types of loads may lead to improved drying and treatment performance.

While the methods 100 and 200 are described separately, it is within the scope of the invention for the methods 100 and 200 to be used in combination to determine the presence of a bulky item and set one or more operating parameters according to the detected presence or absence of a bulky item.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method for controlling an operation of a laundry treating appliance comprising a rotatable drum at least partially defining a treating chamber for receiving laundry for treatment in accordance with a treating cycle of operation, the method comprising:

imaging the laundry to generate image data with an imaging device having at least a portion located within the laundry treating appliance during execution of the cycle of operation;

comparing the image data to reference image data indicative of either bulky or non-bulky items by a controller having memory in which is stored computer software for comparing the image data; and determining a presence of a bulky laundry item based on the comparison of the image data to reference image data.

2. The method according to claim 1, and further comprising setting at least one parameter of the treating cycle of operation based on the determined presence of a bulky laundry item.

3. The method according to claim 2 wherein the at least one parameter is one of a rotational speed of a drum, a direction of drum rotation, a temperature in the treating chamber, an air flow through the treating chamber, a type of treating chemistry, an amount of treating chemistry, a start of cycle condition, an end of cycle condition, a start of cycle step condition, an end of cycle step condition, a rotational speed of an agitator, a direction of agitator rotation, or a wash liquid fill level.

4. The method according to claim 1, and further comprising selecting the treating cycle of operation based on the determined presence of a bulky laundry item.

5. The method according to claim 1 wherein the imaging comprises capturing at least one image of a portion of the treating chamber.

6. The method according to claim 5 wherein determining the presence of a bulky laundry item comprises analyzing the at least one image by isolating the laundry from a background in the at least one image.

7. The method according to claim 1 wherein the imaging comprises taking at least one of a still image or a moving image.

8. The method according to claim 7 wherein the imaging comprises capturing a digital image.

9. The method according to claim 1 wherein the imaging comprises taking at least one of a visible light image, an ultraviolet light image or an infrared image.

10. A method for controlling an operation of a laundry treating appliance comprising a rotatable drum at least partially defining a treating chamber for receiving laundry for treatment in accordance with a treating cycle of operation, the method comprising:

imaging the laundry to generate image data with an imaging device having at least a portion located within the laundry treating appliance during execution of the cycle of operation;

comparing a movement of a feature of the laundry relative to the drum by processing the image data with computer software stored in a controller; and determining a presence of a bulky laundry item based on the comparison of the movement of the feature of the laundry relative to the drum.

11. The method according to claim 10, and further comprising setting at least one parameter of the treating cycle of operation based on the determined presence of a bulky laundry item.

12. The method according to claim 11 wherein the at least one parameter is one of a rotational speed of a drum, a direction of drum rotation, a temperature in the treating chamber, an air flow through the treating chamber, a type of treating chemistry, an amount of treating chemistry, a start of cycle condition, an end of cycle condition, a start of cycle step condition, an end of cycle step condition, a rotational speed of an agitator, a direction of agitator rotation, or a wash liquid fill level.

13. The method according to claim 10, and further comprising selecting the treating cycle of operation based on the determined presence of a bulky laundry item.

14. The method according to claim 10 wherein the imaging comprises capturing at least one image of a portion of the treating chamber.

15. The method according to claim 14 wherein determining the presence of a bulky laundry item comprises analyzing the at least one image by isolating the laundry from a background in the at least one image.

16. The method according to claim 10 wherein the comparing the movement comprises comparing the movement of the feature to a movement of the drum.

17. The method according to claim 16 wherein the comparing the movement of the feature comprises identifying an edge feature.

18. The method according to claim 17 wherein the identifying an edge feature comprises identifying at least one of an entire edge, a portion of an edge, or a prominent edge feature.

19. The method according to claim 10 wherein the imaging comprises taking at least one of a still image or a moving image.

20. The method according to claim 19 wherein the imaging comprises capturing a digital image.

21. The method according to claim 10 wherein the imaging comprises taking at least one of a visible light image, an ultraviolet light image or an infrared image.

22. A method for controlling an operation of a laundry treating appliance comprising a rotatable drum at least partially defining a treating chamber for receiving laundry for treatment in accordance with a treating cycle of operation, the method comprising:

imaging the laundry to generate image data with an imaging device having at least a portion located within the laundry treating appliance during execution of the cycle of operation;

determining a color signature of at least a portion of the laundry from the image data by processing the image data with computer software stored in a controller; and determining a presence of a bulky laundry item based on the determined color signature.

23. The method according to claim 22, and further comprising comparing the color signature to a reference color signature.

24. The method according to claim 22, and further comprising setting at least one parameter of the treating cycle of operation based on the determined presence of a bulky laundry item.

25. The method according to claim 24 wherein the at least one parameter is one of a rotational speed of a drum, a direction of drum rotation, a temperature in the treating chamber, an air flow through the treating chamber, a type of treating chemistry, an amount of treating chemistry, a start of cycle condition, an end of cycle condition, a start of cycle step condition, an end of cycle step condition, a rotational speed of an agitator, a direction of agitator rotation, or a wash liquid fill level.

26. The method according to claim 22, and further comprising selecting the treating cycle of operation based on the determined presence of a bulky laundry item.

27. The method according to claim 22 wherein the imaging comprises capturing at least one image of a portion of the treating chamber.

28. The method according to claim 27 wherein determining the presence of a bulky laundry item comprises analyzing the at least one image by isolating the laundry from a background in the at least one image.

29. The method according to claim 22 wherein the imaging comprises taking at least one of a still image or a moving image.

30. The method according to claim 29 wherein the imaging comprises capturing a digital image.

31. The method according to claim 22 wherein the imaging comprises taking at least one of a visible light image, an ultraviolet light image or an infrared image.

32. A method for controlling an operation of a laundry treating appliance comprising a rotatable drum at least partially defining a treating chamber for receiving laundry for treatment in accordance with a treating cycle of operation, the method comprising:

automatically determining by a controller having memory storing computer software for controlling the operation of the laundry treating appliance, a presence of a bulky laundry item in the treating chamber;

setting at least one parameter of a treating cycle of operation of the laundry treating appliance based on the determined presence of a bulky laundry item; and dispensing a treating chemistry into the treating chamber;

wherein at least one of a type or amount of the treating chemistry is selected based on the determined presence of a bulky laundry item.

33. The method according to claim 32 wherein the at least one parameter is one of a rotational speed of a drum, a direction of drum rotation, a temperature in the treating chamber, an air flow through the treating chamber, a start of cycle condition, an end of cycle condition, a start of cycle step condition, an end of cycle step condition, a rotational speed of an agitator, a direction of agitator rotation, or a wash liquid fill level.

34. The method according to claim 32, further comprising capturing at least one image of at least a portion of the treating chamber, and wherein determining the presence of a bulky laundry item comprises analyzing the at least one image by isolating the laundry from a background in the at least one image.

35. The method according to claim 32, further comprising imaging the laundry to generate image data, and wherein the determination of the presence of a bulky item comprises comparing the image data to reference image data indicative of either bulky or non-bulky laundry items.

36. The method according to claim 35 wherein the determination of the presence of a bulky laundry item comprises determining a color signature of at least a portion of the laundry from the image data.

37. The method according to claim 32 wherein the determining of a bulky laundry item comprises comparing a movement of a feature of the laundry relative to the drum.

38. A laundry treating appliance for treating laundry in accordance with a treating cycle of operation, comprising:

a treating chamber;

an imaging device having at least a portion located within the laundry treating appliance during execution of the cycle of operation and configured to generate image data representative of laundry in the treating chamber;

a dispensing system configured to dispense a treating chemistry into the treating chamber; and a controller operably coupled to the imaging device and configured to determine a presence of a bulky laundry item in the treating chamber by processing the image data with computer software stored in the controller and control the treating cycle of operation and the dispensing system based on the presence of the bulky laundry item;

wherein at least one of a type or an amount of the treating chemistry is selected based on the determined presence of a bulky item.

39. The laundry treating appliance according to claim 38 wherein the imaging device comprises a camera.

40. The laundry treating appliance according to claim 38 wherein the imaging device captures at least one of a visible light image, an ultraviolet light image or an infrared image.

41. The laundry treating appliance according to claim 38 wherein the controller is further configured to select the treating cycle of operation based on the determined presence of a bulky laundry item.

42. The laundry treating appliance according to claim 38 wherein the controller is further configured to set at least one parameter of the treating cycle of operation based on the determined presence of a bulky laundry item.

43. The laundry treating appliance according to claim 42 wherein the at least one parameter is one of a rotational speed of a drum, a direction of drum rotation, a temperature in the treating chamber, an air flow through the treating chamber, a start of cycle condition, an end of cycle condition, a start of cycle step condition, an end of cycle step condition, a rotational speed of an agitator, a direction of agitator rotation, or a wash liquid fill level.

44. The laundry treating appliance of claim 38 and further comprising at least one of the following sensors operably coupled to the controller and providing a corresponding input to the controller: a treating chamber temperature sensor, an inlet air temperature sensor, an exhaust air temperature sensor, a moisture sensor, an air flow rate sensor, a weight sensor, or a motor torque sensor.

45. A method for controlling an operation of a laundry treating appliance comprising a rotatable drum at least partially defining a treating chamber for receiving laundry for treatment in accordance with a treating cycle of operation, the method comprising:

imaging the laundry to generate image data with an imaging device having at least a portion located within the laundry treating appliance during execution of the cycle of operation;

determining a presence of a bulky laundry item from the image data by processing the image data with computer software stored in a controller; and dispensing a treating chemistry into the treating chamber;

wherein at least one of a type or an amount of the treating chemistry is based on the determined presence of a bulky laundry item.

46. The method according to claim 45, and further comprising setting at least one parameter of the treating cycle of operation based on the determined presence of a bulky laundry item.

47. The method according to claim 46 wherein the at least one parameter is one of a rotational speed of a drum, a direction of drum rotation, a temperature in the treating chamber, an air flow through the treating chamber, a type of treating chemistry, an amount of treating chemistry, a start of cycle condition, an end of cycle condition, a start of cycle step condition, an end of cycle step condition, a rotational speed of an agitator, a direction of agitator rotation, or a wash liquid fill level.

48. The method according to claim 45, and further comprising selecting the treating cycle of operation based on the determined presence of a bulky laundry item.

49. The method according to claim 45 wherein the imaging comprises capturing at least one image of a portion of the treating chamber.

50. The method according to claim 49 wherein determining the presence of a bulky laundry item comprises analyzing the at least one image by isolating the laundry from a background in the at least one image.

51. The method according to claim 45 wherein the imaging comprises taking at least one of a still image or a moving image.

52. The method according to claim 51 wherein the imaging comprises capturing a digital image.

53. The method according to claim 45 wherein the imaging comprises taking at least one of a visible light image, an ultraviolet light image or an infrared image.

* * * * *